(12) United States Patent
Gupta et al.

(10) Patent No.: US 9,749,960 B2
(45) Date of Patent: Aug. 29, 2017

(54) ADAPTABLE POWER-BUDGET FOR MOBILE DEVICES

(71) Applicant: Dell Products, L.P., Round Rock, TX (US)

(72) Inventors: Chitrak Gupta, Bangalore (IN); Sushma Baravarajaiah, Bangalore (IN)

(73) Assignee: DELL PRODIUCTS, L.P., Round Rock, TX (US)

( * ) Notice: Subject to any disclaimer, the term of this patent is extended or adjusted under 35 U.S.C. 154(b) by 243 days.

(21) Appl. No.: 14/615,179

(22) Filed: Feb. 5, 2015

(65) Prior Publication Data
US 2016/0234785 A1 Aug. 11, 2016

(51) Int. Cl.
*H04M 1/00* (2006.01)
*H04W 52/02* (2009.01)

(52) U.S. Cl.
CPC ... *H04W 52/0258* (2013.01); *H04W 52/0296* (2013.01); *Y02B 60/50* (2013.01)

(58) Field of Classification Search
USPC .............................. 455/571–575.8, 550.1–551
See application file for complete search history.

(56) References Cited

U.S. PATENT DOCUMENTS

| | | | | |
|---|---|---|---|---|
| 6,329,794 B1* | 12/2001 | Oeda | ......................... | H02J 1/14 320/130 |
| 7,528,577 B2* | 5/2009 | Hara | ..................... | G06F 1/3203 320/132 |
| 7,725,094 B2* | 5/2010 | Chary | ................... | G06F 1/3203 455/343.2 |
| 8,188,704 B2* | 5/2012 | Reese | ................. | B60L 11/1851 320/103 |
| 2006/0111155 A1* | 5/2006 | Kim | ..................... | H01M 2/1055 455/574 |
| 2008/0057894 A1* | 3/2008 | Aleksic | ................... | H02J 9/002 455/187.1 |
| 2008/0227440 A1* | 9/2008 | Settepalli | ........ | H04M 1/274558 455/418 |
| 2011/0009172 A1* | 1/2011 | Song | ................. | H04M 1/72544 455/573 |
| 2011/0159931 A1* | 6/2011 | Boss | ................. | H04W 52/0264 455/574 |
| 2015/0153810 A1* | 6/2015 | Sasidharan | ........... | G06F 1/3212 713/320 |
| 2015/0188997 A1* | 7/2015 | Park | ....................... | G06F 1/163 709/201 |

* cited by examiner

*Primary Examiner* — Dai A Phuong
(74) *Attorney, Agent, or Firm* — Norton Rose Fulbright US LLP (57) ABSTRACT

Embodiments of methods and systems for adaptable power-budget for mobile devices are presented. In an embodiment, a method may include determining a classification of processes to be executed by a processing device. Such a method may also include detecting a process to be executed by the processing device. Additionally, the method may include selectively providing power to the processing device from one or more of a primary battery and a secondary battery in response to the classification of the detected process.

20 Claims, 6 Drawing Sheets

ADAPTABLE POWER-BUDGET FOR MOBILE DEVICES

FIELD

This disclosure relates generally to information handling systems, and more specifically, to adaptable power-budget for mobile devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are implemented as mobile data devices. Mobile date devices include smartphones, tablets and hybrids. One major problem with such devices has been effective management of battery usage, because mobile devices are generally designed to be used untethered from a wired power supply and operated for extended periods on a battery. Some tablet and hybrid devices have battery cycles that last for nearly 10 hours; however, use of internet or graphic rich applications drain the battery more quickly, which may cause the device to turn off. Problematically, critical operations may be hindered when the battery loses power and the device shuts off.

Because of battery life issues, users of mobile devices often try to limit power usage by limiting use of 3G or 4G communications, disabling use of background synchronization processes and reduce the screen brightness. Unfortunately, these types of measures limit the full use and functionality of the mobile device.

SUMMARY

Embodiments of methods and systems for adaptable power-budget for mobile devices are presented. In an embodiment, a method may include determining a classification of processes to be executed by a processing device. Such a method may also include detecting a process to be executed by the processing device. Additionally, the method may include selectively providing power to the processing device from one or more of a primary battery and a secondary battery in response to the classification of the detected process.

In an embodiment, the classification of processes is organized according to a hierarchy. The processes may be classified according to a ring hierarchy, each ring being assigned a priority level, the priority level determining which of the primary battery or the secondary battery is selected to provide power to the processing device.

In some embodiments, the method may include providing an initial template for the classification of processes that are initially installed for execution by the processing device. The initial template may be updatable in response to an identified process usage pattern. In another embodiment, the initial template is updatable in response to a user input.

In an embodiment, selectively providing power to the processing device includes determining a charge level of the primary battery. Selectively providing power to the processing device may also include determining a charge level of the secondary battery.

In an embodiment, the method may include limiting execution of the detected process in response to the classification of the detected process and in response to a measurement of a charge level of at least one of the primary battery and the secondary battery.

An information handling system is also presented. In an embodiment, the system may include a processing device configured to execute one or more processes. The system may also include a battery unit configured to determine a classification of processes to be executed by the processing device, detect a process to be executed by the processing device, and selectively provide power to the processing device from one or more of a primary battery and a secondary battery in response to the classification of the detected process.

An apparatus is also described. In some embodiments, the apparatus may include a processing device configured to execute one or more processes, and determine a classification of processes to be executed by the processing device, detect a process to be executed by the processing device, and selectively provide power to the processing device from one or more of a primary battery and a secondary battery in response to the classification of the detected process.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

The proposed solution is based on an adaptive learning system for profiling the battery usage per process, and adding a compartmentalized battery for servicing the highest priority process as decided by the algorithm on top. The compartmentalized battery is a unique concept where two batteries will be housed as a single unit but the reserve battery will be used only when the algorithm decides that a process needs to use it.

Figure 1:
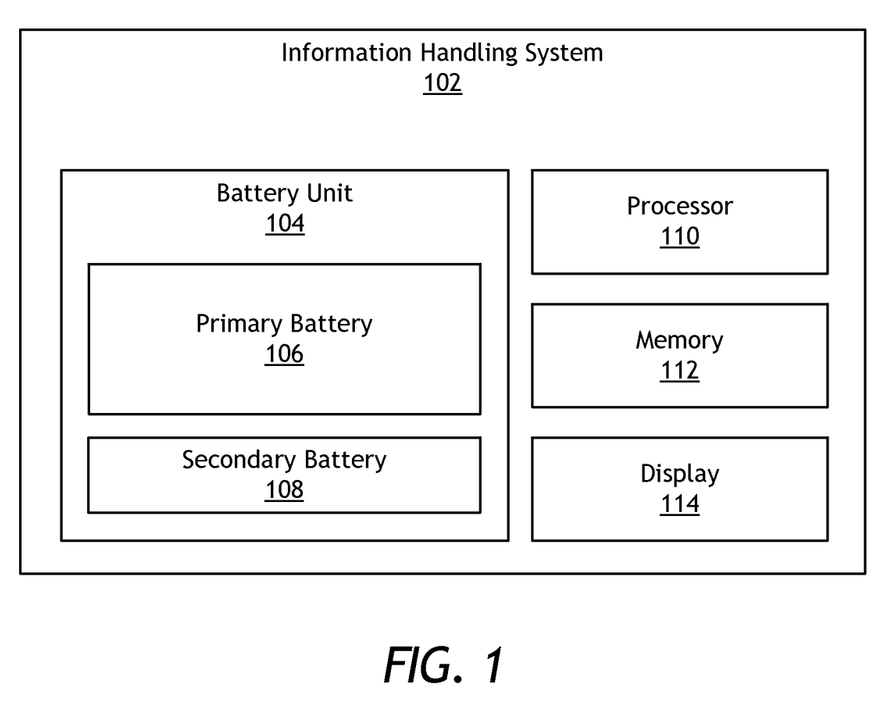
FIG. 1 is a schematic block diagram illustrating one embodiment of an information handling system for adaptable power-budget.

FIG. 1 is a schematic circuit diagram illustrating one embodiment of an information handling system 102 for adaptable power-budgeting in a mobile device. In various embodiments, a mobile device may include a smartphone, a mobile data device, a mobile music player, a tablet computer device, a laptop computer device, a Global Positioning Satellite (GPS) device, or the like. One of ordinary skill will recognize a wide variety of mobile devices with which the present embodiments may be suitably employed.

For purposes of this disclosure, an information handling system 102 may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system 102 may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system 102 may include random access memory (RAM), one or more processing resources such as a central processing unit (CPU) or hardware or software control logic, ROM, and/or other types of nonvolatile memory. Additional components of the information handling system 102 may include one or more disk drives, one or more network ports for communicating with external devices as well as various input and output (I/O) devices, such as a keyboard, a mouse, touchscreen and/or a video display. The information handling system 102 may also include one or more buses operable to transmit communications between the various hardware components.

In an embodiment, the information handling system 102 may include a battery unit 104, a processor 110, a memory device 112, and a display device 114. In such an embodiment, the battery unit 104 may include a primary battery 106 and a secondary battery 108. Examples of batteries that may be used according to the present embodiments include lithium-ion battery cells, and the like. In an embodiment, the primary battery 106 may be larger and/or hold more charge than the secondary battery 108. The battery unit 104 may be used to power other components of the information handling system 102, including for example, the processor 110, the memory device 112, and the display device 114. One of ordinary skill will recognize additional components which may be powered by the battery unit 104, including a network interface device, etc.

Figure 2:
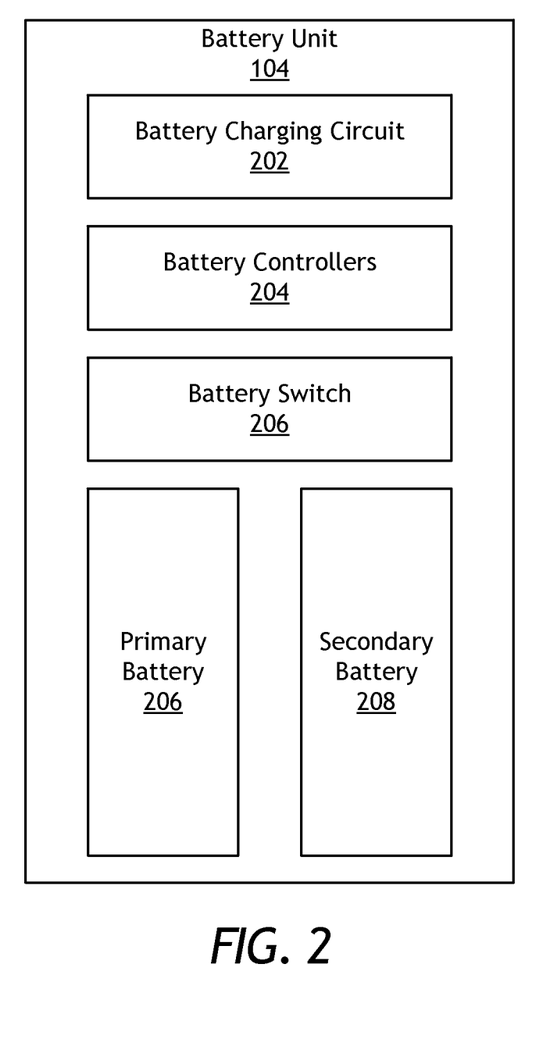
FIG. 2 is a schematic block diagram illustrating one embodiment of a battery unit for adaptable power-budgeting in a mobile device.

FIG. 2 illustrates a further embodiment of a battery unit 104. In the embodiment of FIG. 2, the battery unit 104 may include the primary battery 106 and the secondary battery 108 as described above. In addition, however, the battery unit 104 may include one or more battery power management controllers, such as battery charging circuit 202, battery controller(s) 204, and battery switch 206.

In an embodiment, the battery charging circuit 202 may receive charge from an external power source, such as a wall plug or transformer, and apply the charge to either the primary battery 106, the secondary battery 108, or both. In a further embodiment, the battery charging circuit 202 may transfer charge from the primary battery 106 to the secondary battery 108, or vice versa, in response to a determination that a charge imbalance exists. In some embodiments, the battery charging circuit 202 may monitor a charge level on the primary battery 106, the secondary battery 108, or both.

In an embodiment, the battery controller 204 may receive a signal from one or more external battery management modules, an external power source, the battery charging circuit 202, or the like, and selectively engage the battery switch 206 in response to the received signal(s). For example, the battery controller 204 may receive a signal indicating that power is available from an external power supply, and a second signal indicating that the power level of the primary battery 106 is below a threshold value. In response, the battery controller 204 may cause the battery switch 206 to supply power from the external power source through the battery charging circuit 202 to the primary battery 106. In other embodiments, as described below, the battery controllers 204 may cause the battery switch 206 to selectively supply power to the information handling system 102 from either the primary battery 106, or the secondary battery 108, depending upon the type of process to be handled by the processor 110.

Figure 3:
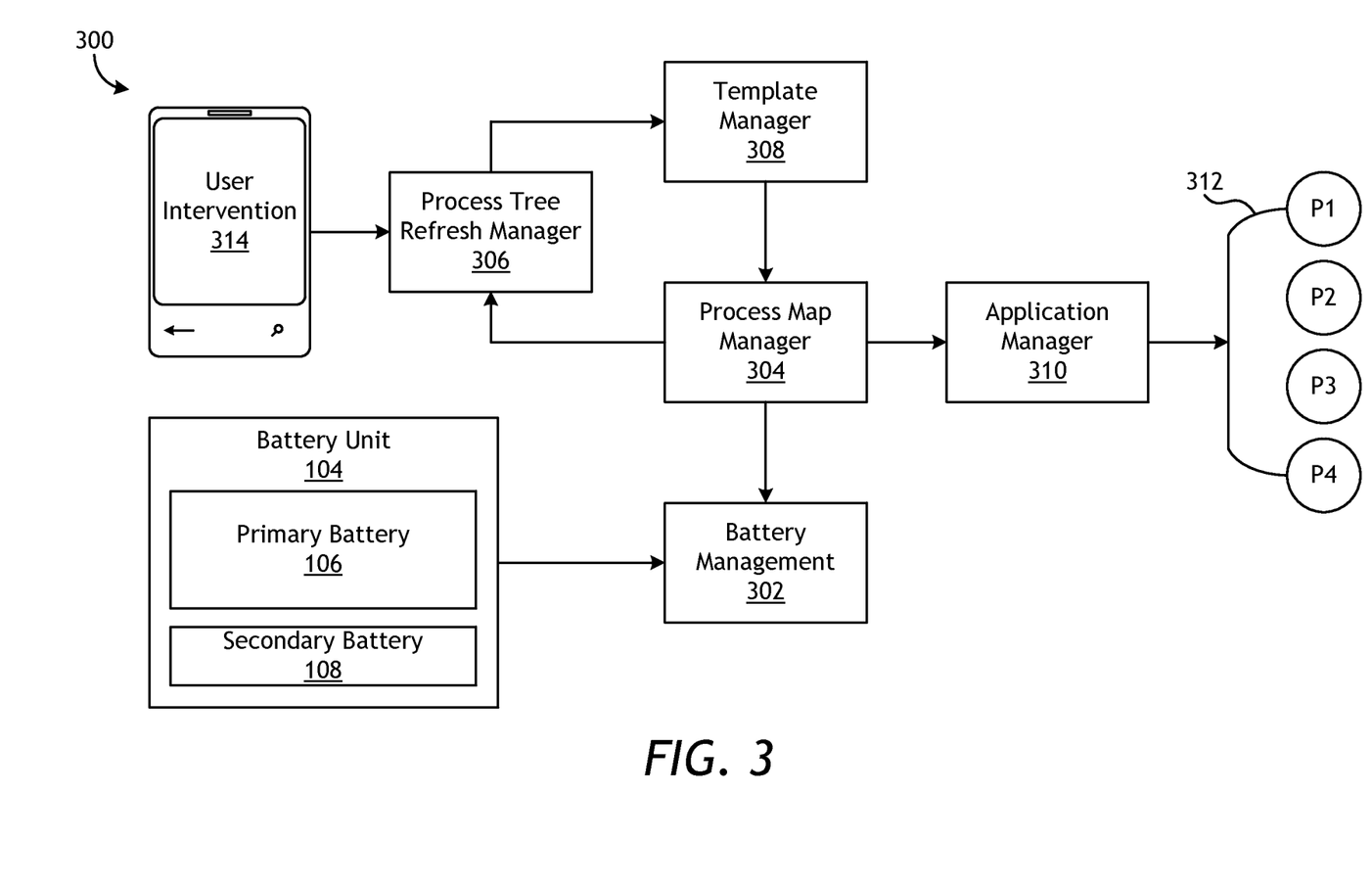
FIG. 3 is a schematic block diagram illustrating one embodiment of a circuit for adaptable power-budgeting in a mobile device.

FIG. 3 is a schematic block diagram illustrating one embodiment of a circuit 300 for adaptable power-budgeting in a mobile device. In an embodiment, blocks 302-310 may be implemented in the battery controller 204 that is internal to the battery unit 104. In other embodiments, aspects of blocks 302-310 may be implemented in the processor 110, or in other dedicated hardware, such as an Application Specific Integrated Circuit (ASIC), chipset, or the like. One of ordinary skill may recognize various ways of implementing blocks 302-310.

In an embodiment, the template manager 308 will maintain a process hierarchy or priority ranking. Additionally, the template manager 308 may maintain process rings or levels that may be created according to the hierarchical levels, as described below with relation to FIG. 4.

In an embodiment, the template manager 308 may be pre-loaded with an initial usage template. For example, the initial usage template may define whether the process that are operated by the stock or natively installed applications or processes are to be assigned to the primary battery 106 or to the secondary battery 108. In an embodiment, the template manager 308 may update the template in response to usage data collected during use of the system, or in response to installation of new applications or execution of new processes. In still a further embodiment, the template manager 308 may update the template in response to user input received via the user interface 314.

The process map manager 304 may map processes 312 executed by the processor 110 with battery preferences in the template. In certain embodiments, the process map manager 304 may collect process execution data, which may be sent to the process tree refresh manager 306 for updating the battery preferences maintained by the template manager 308. For example, process execution data may include the frequency of execution of the process, measurements of the duration of process execution, process priority designations from the user, etc. In further embodiments, the process tree refresh manager 306 may additionally receive user preferences via the user interface 314 for updating the battery preferences managed by the template manager 308. In an embodiment, the application manager 310 may receive or generate new information in response to newly installed applications, deleted applications, application priority changes, application run-time settings, running applications, dormant applications, etc. The application manager 310 may pass on these settings to the template manager 308 for updating the process battery preferences.

In certain embodiments, the battery manager 302 may include the battery charging circuit 202, the battery controllers 204, the battery switch 206, and all associated functions as described in FIG. 2. In the embodiment of FIG. 3, the battery manager 302 may be external to the battery unit 104, and the battery unit 104 may include a primary battery 106 and a secondary battery 108. In certain embodiments, the battery manager 302 may provide feedback to the process manager 304, including battery charge levels, etc. The process manager 304 may then determine whether a given process should be executed by the processor 110 using power from the primary battery 106 or using power from the secondary battery 108. The process manager 304 may further send a switching signal to the battery manager 302 indicating which battery should provide the power.

Figure 4:
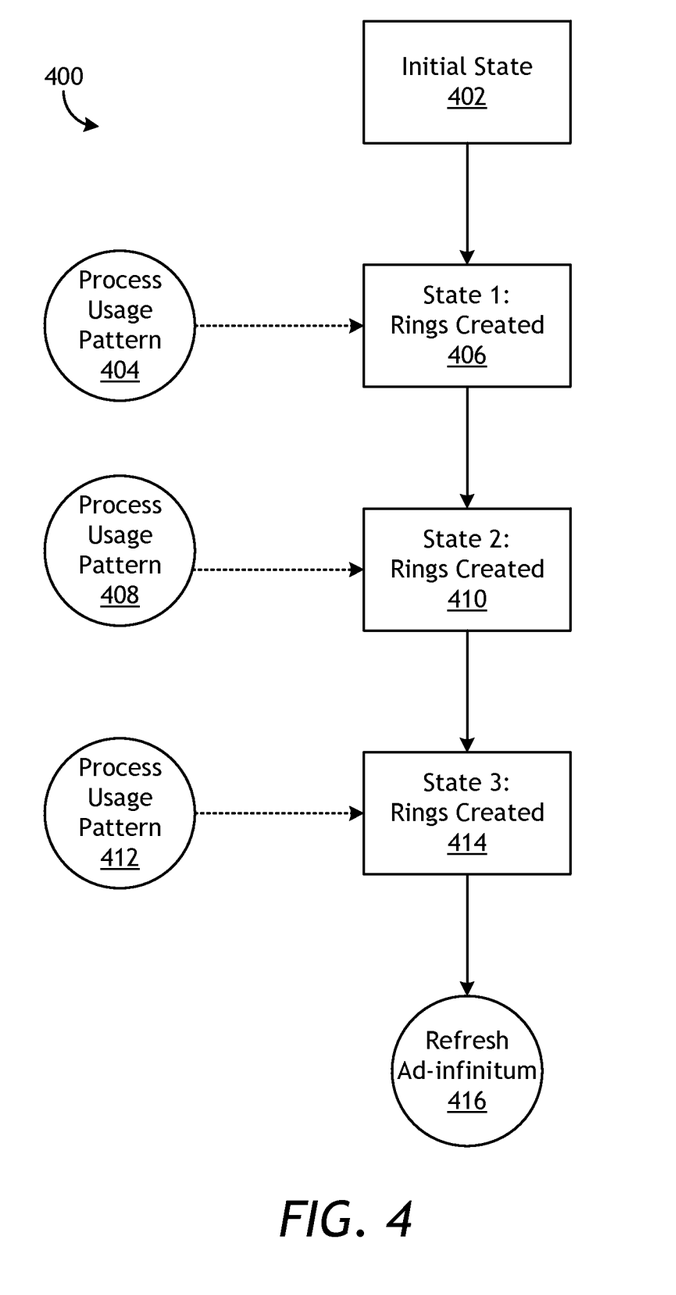
FIG. 4 is a schematic diagram illustrating one embodiment of a state diagram for adaptable power-budgeting in a mobile device.

FIG. 4 is a schematic diagram illustrating one embodiment of a state diagram 400 for adaptable power-budgeting in a mobile device. In an initial state 402, the device may operate according to a predetermined template of application or process priorities and battery usage profiles. In certain embodiments, the template may define a process or application hierarchy. In some embodiments, the hierarchy may be expressed as rings, where processes or applications assigned to a first ring are given a first priority and processes or applications assigned to a second ring are given a second priority. One of ordinary skill may recognize alternative hierarchy definitions or organizations which may be suitable according to the present embodiments.

Process usage data may be collected, by the process map manager 304 for example, and a process usage pattern may be established. After a predetermined refresh period, the rings may be created or updated based upon the process usage pattern 404 and the device may enter a first state 406 wherein the hierarchy is established or updated. In an embodiment, the process usage pattern 408 may be further monitored and updated as shown at 408. At a second state 410, the hierarchy may be updated with the further usage pattern 408. At a third state 414, the hierarchy may be updated with usage pattern intervention data 412 received from a user, e.g., via the user interface 314. This process may run in a continuous loop as shown at 416.

Figure 5:
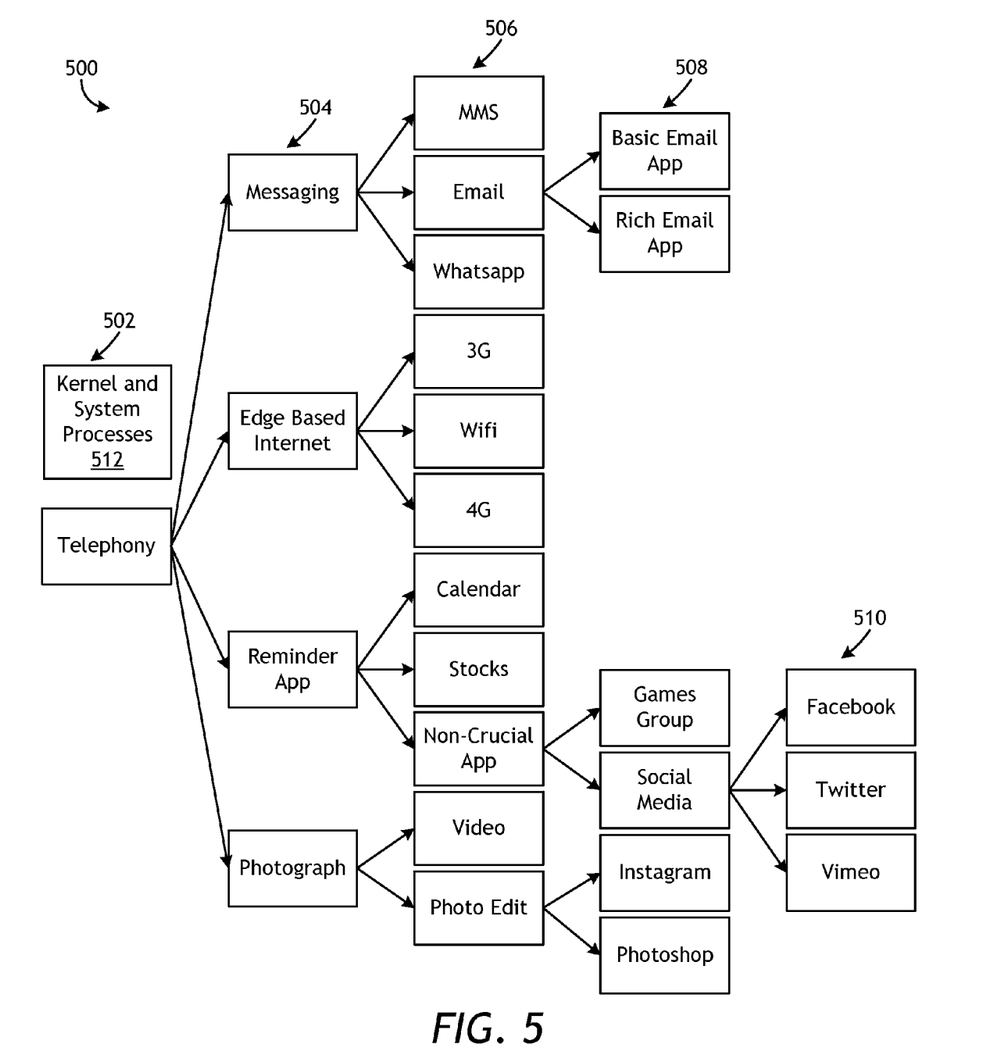
FIG. 5 is a schematic diagram illustrating one embodiment of a process priority diagram for adaptable power-budgeting in a mobile device.

FIG. 5 is a schematic diagram illustrating one embodiment of a process priority diagram for adaptable power-budgeting in a mobile device. The diagram of FIG. 5 illustrates one example of a ring hierarchy 500, where system processes and/or applications are arranged in a set of priority rings 502-510. For example, all kernel and system processes may be designated as first level priority and assigned to the first ring 502. In such an embodiment, the kernel and system processes, may receive the highest priority and access to resources from both the primary battery 106 and the secondary battery 108. Basic communication functionality like telephony or text messaging (SMS) may be assigned to a second priority ring 504 and assigned resources from the primary battery 106 and/or the secondary battery 108, depending upon system battery resources, usage patterns, and/or user designations. Medium priority services, such as email, MMS, WiFi communications, or mobile data services may be assigned to a medium level priority, such as the third ring 506. Such processes may be granted access to resources from the primary battery 106 and the secondary battery 108, but only in limited circumstances as defined by the usage patterns and the battery priority profile. Lower-priority, but often used processes may be assigned to the fourth ring 508, which may not be able to use the secondary battery 108. Finally, in an embodiment, the lowest priority applications and processes may be assigned to the lowest level, or the fifth ring 510 in this example. In such an embodiment, the applications in the fifth ring 510 may not be provisioned with resources from the secondary battery 108, and may only be allowed to operate when the primary battery 106 is charged above a threshold value.

Figure 6:
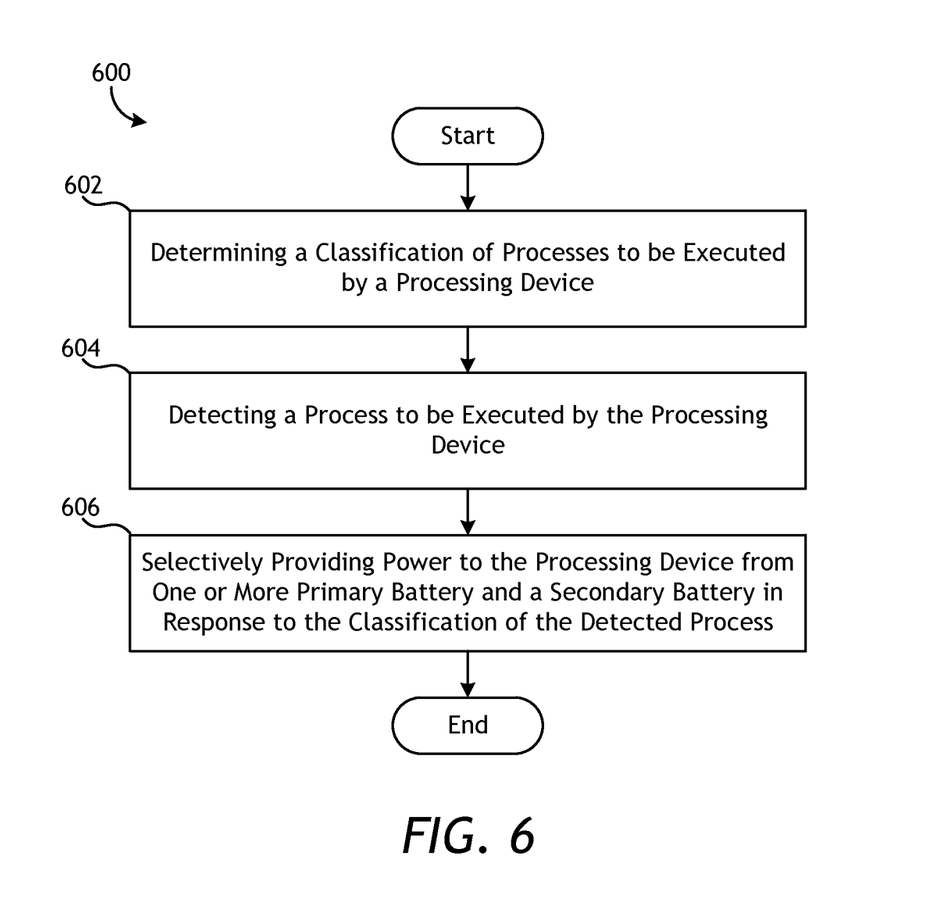
FIG. 6 is a flowchart diagram illustrating one embodiment of a method for adaptable power-budgeting in a mobile device.

FIG. 6 is a flowchart diagram illustrating one embodiment of a method for adaptable power-budgeting in a mobile device.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms, "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method comprising:
   determining a classification of processes to be executed by a processing device, wherein the step of determining comprises:
      providing an initial template for the classification of processes;
      updating the initial template in response to an identified process usage pattern to classify processes into one of at least a first priority and a second priority based on an adaptive learning system for profiling battery usage per process of the processes;
   detecting a process to be executed by the processing device;
   identifying a classification of the detected process; and
   selectively providing power to the processing device from one or more of a primary battery and a secondary battery in response to the classification of the detected process, wherein power is provided from at least the primary battery when the identified classification is the first priority and power is not provided from the secondary battery when the identified classification is the second priority.

2. The method of claim 1, wherein the classification of processes is organized according to a hierarchy.

3. The method of claim 2, wherein the processes are classified according to a ring hierarchy, each ring being assigned a priority level, the priority level determining which of the primary battery or the secondary battery is selected to provide power to the processing device.

4. The method of claim 1, wherein the initial template is for the classification of processes that are initially installed for execution by the processing device.

5. The method of claim 4, wherein the initial template is updatable in response to a user input.

6. The method of claim 1, wherein selectively providing power to the processing device further comprises determining a charge level of the primary battery.

7. The method of claim 1, wherein selectively providing power to the processing device further comprises determining a charge level of the secondary battery.

8. The method of claim 1, further comprising limiting execution of the detected process in response to the classification of the detected process and in response to a measurement of a charge level of at least one of the primary battery and the secondary battery.

9. The method of claim 1, wherein updating the initial template comprises updating the initial template to classify processes into one of at least a first priority, a second priority, and a third priority, wherein power is provided from the primary battery when a charge level of the primary battery is above a threshold value when the identified classification is the third priority, and wherein power is not provided from the secondary battery when the identified classification is the third priority.

10. The method of claim 9, identifying a classification comprises:
    identifying an application as a basic communications application classified in the first priority;
    identifying an application as a medium priority service in the second priority; and
    identifying an application as a lower priority application in the third priority.

11. An information handling system, comprising:
    a processing device configured to execute one or more processes,
    wherein the processing device is configured to:
       determine a classification of processes to be executed by the processing device by:
          receiving an initial template for the classification of processes;
          updating the initial template in response to an identified process usage pattern to classify processes into one of at least a first priority and a second priority based on an adaptive learning system for profiling battery usage per process of the processes;
       detect a process to be executed by the processing device;
       identify a classification of the detected process; and
       selectively provide power to the processing device from one or more of a primary battery and a secondary battery in response to the classification of the detected process, wherein power is provided from at least the first battery when the identified classification is the first priority and power is not provided from the second battery when the identified classification is the second priority.

12. The information handling system of claim 11, wherein the classification of processes is organized according to a hierarchy.

13. The information handling system of claim 12, wherein the processes are classified according to a ring hierarchy, each ring being assigned a priority level, the priority level determining which of the primary battery or the secondary battery is selected to provide power to the processing device.

14. The information handling system of claim 11, comprising a template manager configured to provide an initial template for the classification of processes that are initially installed for execution by the processing device.

15. The information handling system of claim 14, comprising a process tree refresh manager configured to update the initial template in response to a user input.

16. The information handling system of claim 11, further comprising a battery manager configured to determine a charge level of the primary battery.

17. The information handling system of claim 11, further comprising a battery manager configured to determine a charge level of the secondary battery.

18. The information handling system of claim 11, further comprising an application manager configured to limit execution of the detected process in response to the classification of the detected process and in response to a measurement of a charge level of at least one of the primary battery and the secondary battery.

19. The information handling system of claim 11, wherein the information handling system is a mobile data device.

20. An apparatus, comprising:
    a processing device configured to:
       execute one or more processes;
       determine a classification of processes to be executed by the processing device by:
          receiving an initial template for the classification of processes;
          updating the initial template in response to an identified process usage pattern to classify processes into one of at least a first priority and a second priority based on an adaptive learning system for profiling battery usage per process of the processes;
detect a process to be executed by the processing device;
identify a classification of the detected process; and
selectively provide power to the processing device from one or more of a primary battery and a secondary battery in response to the classification of the detected process, wherein power is provided from at least the first battery when the identified classification is the first priority and power is not provided from the second battery when the identified classification is the second priority.

* * * * *